US009766993B2

(12) United States Patent
Agrawal et al.

(10) Patent No.: US 9,766,993 B2
(45) Date of Patent: *Sep. 19, 2017

(54) QUALITY OF INFORMATION ASSESSMENT IN DYNAMIC SENSOR NETWORKS

(75) Inventors: Dakshi Agrawal, Monsey, NY (US); Chatschik Bisdikian, Chappaqua, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 800 days.

This patent is subject to a terminal disclaimer.

(21) Appl. No.: 13/474,887

(22) Filed: May 18, 2012

(65) Prior Publication Data

US 2014/0032175 A1    Jan. 30, 2014

(51) Int. Cl.
  *G06F 11/30*    (2006.01)
  *H04L 29/08*    (2006.01)

(52) U.S. Cl.
  CPC ............. *G06F 11/30* (2013.01); *H04L 67/12* (2013.01)

(58) Field of Classification Search
  CPC ....... G06F 11/20; G06F 11/3055; G06F 11/30
  USPC ..................... 702/104, 182, 28, 14
  See application file for complete search history.

(56) References Cited

U.S. PATENT DOCUMENTS

| 2002/0059078 | A1 | 5/2002 | Valdes et al. |
| 2008/0208367 | A1 | 8/2008 | Koehler et al. |
| 2010/0254282 | A1* | 10/2010 | Chan et al. ................... 370/253 |
| 2010/0293131 | A1* | 11/2010 | Qi et al. ......................... 706/52 |
| 2010/0302975 | A1 | 12/2010 | Klein |
| 2011/0119523 | A1* | 5/2011 | Bisdikian et al. ................ 714/2 |
| 2012/0066169 | A1* | 3/2012 | Ghanadan .............. G06N 7/005 706/52 |
| 2014/0081596 | A1* | 3/2014 | Agrawal ................. H04L 67/12 702/182 |

* cited by examiner

*Primary Examiner* — Mohamed Charioui
*Assistant Examiner* — Catherine Rastovski
(74) *Attorney, Agent, or Firm* — Cantor Colburn LLP

(57) ABSTRACT

Quality of information (QoI) assessment in dynamic sensor networks that includes evaluating, by a computer, a first value reflective of available reports from sensors that are dynamically associated with the computer. A second value reflective of reports expected to have been available for evaluation about the observed phenomena is estimated. A QoI of the available reports is assessed. The assessing is based on the first value reflective of the available reports and the second value reflective of reports expected to have been available for evaluation. A third value, based on the assessing is output.

6 Claims, 7 Drawing Sheets

QUALITY OF INFORMATION ASSESSMENT IN DYNAMIC SENSOR NETWORKS

STATEMENT OF GOVERNMENT INTEREST

This invention was made with Government support under Contract Number: W911NF-06-3-0001 awarded by the U.S. Army. The Government has certain rights in this invention.

BACKGROUND

The present invention relates to wireless networks, and more specifically, to quality of information (QoI) assessment in dynamic sensor networks.

With the increasing reliance on more and more sensors to monitor the state of objects and processes of interest (e.g., humans, engines, structures, environment, traffic, utilities, water supplies, etc.) for various smart planet applications, the QoI reported by sensors becomes more important to sensor aided decision making processes. QoI relates to the level of trust one can place in the validity of a piece of information to determine, for example, whether an event has really occurred, whether the event occurred at the time and place noted in a report from a sensor, and/or whether the sensor is available when it is needed.

When sensor enabled applications are deployed in a tightly-coupled manner along with their sensors (such as for remote healthcare provisioning and structure/building monitoring), applications can be conditioned to identify missing or misbehaving sensor readings. This is due to the strong linkage between information sources (sensors), phenomena observed and the data/information processors involved in assessing the situations observed. For example, for a congestive heart failure monitoring application, the coordination of sensory readings for electrocardiogram (ECG), blood pressure and weight may be involved (A. Misra, M. Blount, A. Kementsietsidis, D. M. Sow, M. Wang, "Advances and Challenges for Scalable Provenance in Stream Processing Systems," IPAW 2008; M. Wang, M. Blount, J. Davis, A. Misra, D. M. Sow, "A Time-and-Value Centric Provenance Model and Architecture for Medical Event Streams," HealthNet 2007). In this example, an ECG sensor on a patient in a remote health monitoring application can only provide ECG observations. Thus, any quality issues concerning the situation relate to the particular sensor (e.g., missing measurements, delayed measurements, or inaccurate measurement due to sensor malfunction or mis-calibration). These sensory readings are directly linked to the application and, therefore, if any of these sensors fail or in general misbehave, this can be uniquely tracked and identified. In this case, with complete knowledge of the sensors reporting to a sensor enabled application, the QoI provided to that application can easily be assessed from the operational characteristics of the sensors involved. The operational characteristics of sensors may include their physical characteristics (e.g., locations) and logical characteristics (e.g., interconnection topologies), as well as the health of the sensors. In cases such as that described above where sensor enabled applications are deployed in a tightly-coupled manner along with their sensors, ratios of the form: the number measurements received or used ("M") over the maximum number of measurements expected ("N"), or "M/N", are often used to reasonably capture the QoI collected.

Along with the previously described well planned and tightly coupled deployment of sensor networks and sensor enabled applications, dynamic sensor networks (e.g., ad hoc and/or mobile) are also emerging and becoming more commonplace. These dynamic sensor networks are deployed to either complement existing tightly coupled sensor networks, or they may exist on their own to be used on demand, for example when tightly coupled sensor networks are not practical. Such is the case when considering sensor networks that are deployed to support dynamically formed multi-party teams, for example for emergency response operations and military coalition intelligence, surveillance, target acquisition, and reconnaissance (I-STAR) operations; vehicle mounted sensors roaming city streets monitoring air quality and reporting traffic conditions, etc.; and social network inspired participatory sensing using body mounted sensory devices (e.g., smartphones), etc. Such deployments result in loosely coupled systems where applications and sensors are deployed separately and then bind and exchange information on demand and for transient periods of time.

BRIEF SUMMARY

Exemplary embodiments include a system for quality of information (QoI) assessment in dynamic sensor networks. A first value reflective of available reports from sensors about an observed phenomena is evaluated by a computer. The sensors are dynamically associated with the computer. A second value reflective of reports expected to have been available for evaluation about the observed phenomena is estimated. A QoI of the available reports is assessed. The assessing is based on the first value reflective of the available reports and the second value reflective of reports expected to have been available for evaluation. A third value, based on the assessing is output.

Exemplary embodiments also include a method and computer program product for receiving reports from sensors about an observed phenomena at a computer. The sensors are dynamically associated with the computer. A status of the sensors is assessed based on contents of the reports and characteristics of the sensors. The status of the sensors in output.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
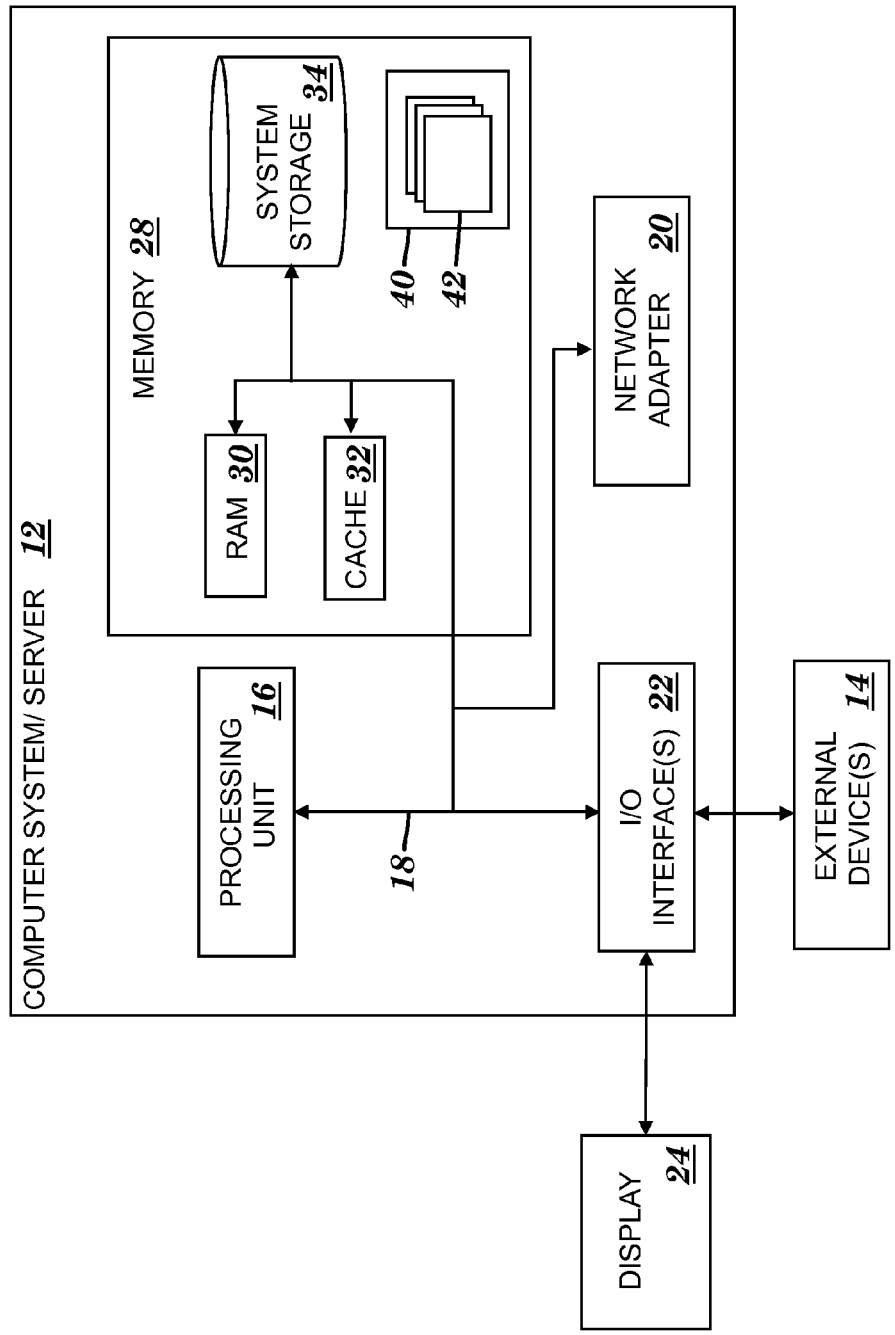
FIG. 1 illustrates a cloud computing node according to an embodiment of the present invention.

Embodiments of the present invention are directed to providing quality of information (QoI) assessment in dynamic, spatially distributed, sensor enabled smart environments. Embodiments estimate the QoI of reports derived from spatially distributed sensor networks that are monitoring events (e.g., threshold crossings of utility grids, traffic conditions, and border protection) by dynamically computing the number of sensors expected to have contributed to the reports based on spatiotemporal properties of reported events.

In an embodiment, sensor network(s) report observed phenomena (also referred to herein as "events") along with a time and place of their occurrence. The system then correlates these spatiotemporal attributes of reported observed phenomena to deployment characteristics of sensor network(s) to estimate a number of sensors that should have contributed to the report (e.g., based on exact deployment technology and/or on a density of deployed sensors). In embodiments, the QoI is estimated using the sensors that should have reported the event and the sensors that actually reported the event (e.g., using the ratio of the corresponding two numbers). In embodiments, reports that are received are analyzed and cross correlated to identify any quality problems with sensory platforms (or sensors). The terms "sensory platforms" and "sensors" are used interchangeably herein.

In an embodiment, QoI assessment in dynamic sensor networks includes evaluating a first value reflective of available reports from sensors that are dynamically associated with a computer. A second value reflective of reports expected to have been available for evaluation about the observed phenomena is estimated. A QoI of the available reports is assessed. The assessing is based on the first value reflective of the available reports and the second value reflective of reports expected to have been available for evaluation. A third value, based on the assessing is output. As used herein, outputting the value refers to making the value available to an entity such as, but not limited to: an application, a register, a storage location, a display, a communication system, and a network. As used herein, the term "value" refers to a number, such as an integer or a floating point number, a collection of numbers, a character, or a collection of characters, a collection or character strings forming text, or a combination of one or more of these. In addition, the collection of numbers and/or characters and strings may be organized in one or more vectors and/or arrays. Further, a combination of numbers and text may include stating the units applicable to the number (e.g., "four reports received").

The term "quality of information" or "QoI" is used herein to refer to the level of trust that can be placed on a piece of information (i.e., how well the information conveys a true state of a monitored region or event). QoI has historically been studied in "rigid" information management systems in enterprise systems (e.g., databases, warehouses). The introduction of sensor networks allows ad-hoc, loosely coupled information sources where approaches used in the past to assess QoI may no longer work. Embodiments described herein aid QoI assessment in cases where sensor networks and sensor enabled applications are loosely coupled, when tracking and identifying specific misbehaving sensors is impossible, or impractical due, for example, to the large number of sensors in the sensor network. The QoI in an ad-hoc sensor network may be affected by many factors such as, but not limited to: operating characteristics of the sensors; operating characteristics of the network services; operating characteristics of an application/processor processing reports from sensors. In embodiments sensors may fixed (e.g., located on a stationary or fixed platform) or they may be mobile (e.g., located on a cellular telephone, a smart telephone, or a tablet computer).

Providing complete assessment of QoI depends on the sensors involved and the applications they feed into. In other words, a complete assessment of QoI is highly case specific. The sensor reports (also referred to herein as "sensory reports") received serve as evidence in favor of (or against) a set of hypotheses about situations being observed in a specific spatiotemporal region (e.g., there has been an increasing traffic volume in the intersection of roads X and Y during the past five minutes) and consequently support decisions to be made. The number of sensor reports in favor of (or against) a hypothesis (i.e., the number of collaborating reports M) relative to the total number of sensor reports that could have provided reports during a particular spatiotemporal region, can serve as a strong indicator for QoI. If, for example, two sensors report the occurrence of an event (e.g., the entrance of a vehicle in a restricted area), one may consider that the event has indeed occurred. However, if the area in question is known to be monitored by twenty sensors of which only two reported the event, then one may interpret the possibility of the event having occurred entirely differently and question the quality of the two reports received. The ratio $q=M/N$ is referred to herein as the QoI ratio and an embodiment uses this ratio as a QoI metric (or at least as a component in a QoI measure). In the QoI ratio, "N", refers to the total number of reports expected.

For tightly coupled sensor enabled systems, such as the ones used, for example, in monitoring the health of humans or structures (e.g., bridges or buildings), the sensors and their sensing capabilities, their number, their location, etc., are all well-known (and presumably well documented and maintained). Hence, the total number, N, that could have reported about the event that the M sensor reports indicate can easily be calculated and thus the QoI ratio $q=M/N$ is easily computed.

In contrast, for loosely coupled sensor networks, where sensors could be mobile or events can happen in different locations in the sensing field (or both), knowing a priori which and how many sensor measurements will ideally contribute to a decision is impossible. Estimating the QoI ratio becomes challenging due to factors such as: the higher operational unpredictability of the loosely coupled sensor systems of interest in embodiments described herein (and therefore the higher need to assess QoI for such systems); and lacking a clear picture of the specifics of the underlying sensor network, even when the numerator M is available (since it is what one receives), estimating the denominator N. When a decision is being made following the collection and analysis of the sensor reports, any association of this decision with a QoI level requires a fresh computation of M and N (and, hence, QoI ratio M/N) as neither quantity is known in advance of receiving the reports.

According to embodiments described herein, ancillary information about the sensor network is utilized to estimate N. For instance, broad properties of the sensor network topology can be used without necessitating the need to identify each and every sensor in the topology. For example, if the sensor deployment is such that it guarantees k-coverage (i.e., each point in the sensing field is observed by k sensors), then N=k. Alternatively, if the sensor node deployment density (e.g., in the region of interest) is "r" and an event can influence an area "A" (e.g., the seismic waves produced by a vehicle can be sensed within an area A), then the expected number of sensors to report is A multiplied by r or "Ar". In embodiments, the density, r, is estimated by analyzing historical data, as in situations like participatory sensing, where density of people in an area as well as statistics of how many people carry cell phones are available. In alternate embodiments, the spread (location) of the sensors reporting the event is used to estimate the area of event influence and this is used to estimate the number of sensors, N, that should report the event.

While the above alternatives relate to estimating the denominator, N, embodiments also deal with further analysis of the numerator, M (i.e., the number of reports received). In situations such as participatory sensing and crowd sensing, where human carried multimodal sensing platforms (e.g., smartphones) are involved, analysis of M may contribute not only to the QoI assessment but may also reveal sensing capabilities (or lack of) of the actual sensing platforms (e.g., smart phones, and/or other devices that contain the sensors) themselves. The latter information is then fed into QoI assessments for the current event or other occasions as well.

For illustrative purposes, suppose that M sensory reports about a particular spatiotemporal region of interest (e.g., close to a sports arena, following a concert event) are available. Of the M sensory reports, M1 reports indicate an event may be occurring in the area, while M2 reports may not be received or may be inconclusive. Suppose also that further analysis of these reports indicates that the overwhelming majority of the M1 reports are generated by smart phones that share a set of common characteristics of type T1 (e.g., running version x.y.z1 of operating system D). On the other hand, the overwhelming majority of the M2 reports are generated by smartphones that share a set of common characteristics of type T2 (e.g., running operating system E, or version x.y.z2 of operating system D). Such analysis may indicate that, for example, smartphones of type T2 may lack a sensing functionality, or that smartphones of Type T1 may be experiencing misbehaving functionality (e.g., a software bug) that erroneously causes the generation of the M1 type of sensory reports (where this bug does not appear in the updated release of the D-version x.y.z2 OS that the M2 type smartphones use). Such analysis allows for the use of incoming reports from sensors for troubleshooting sensing platforms in very loosely coupled systems without the need to closely monitor the platforms themselves but instead comparing their information producing behavior against other platforms that happen to operate in their vicinity.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
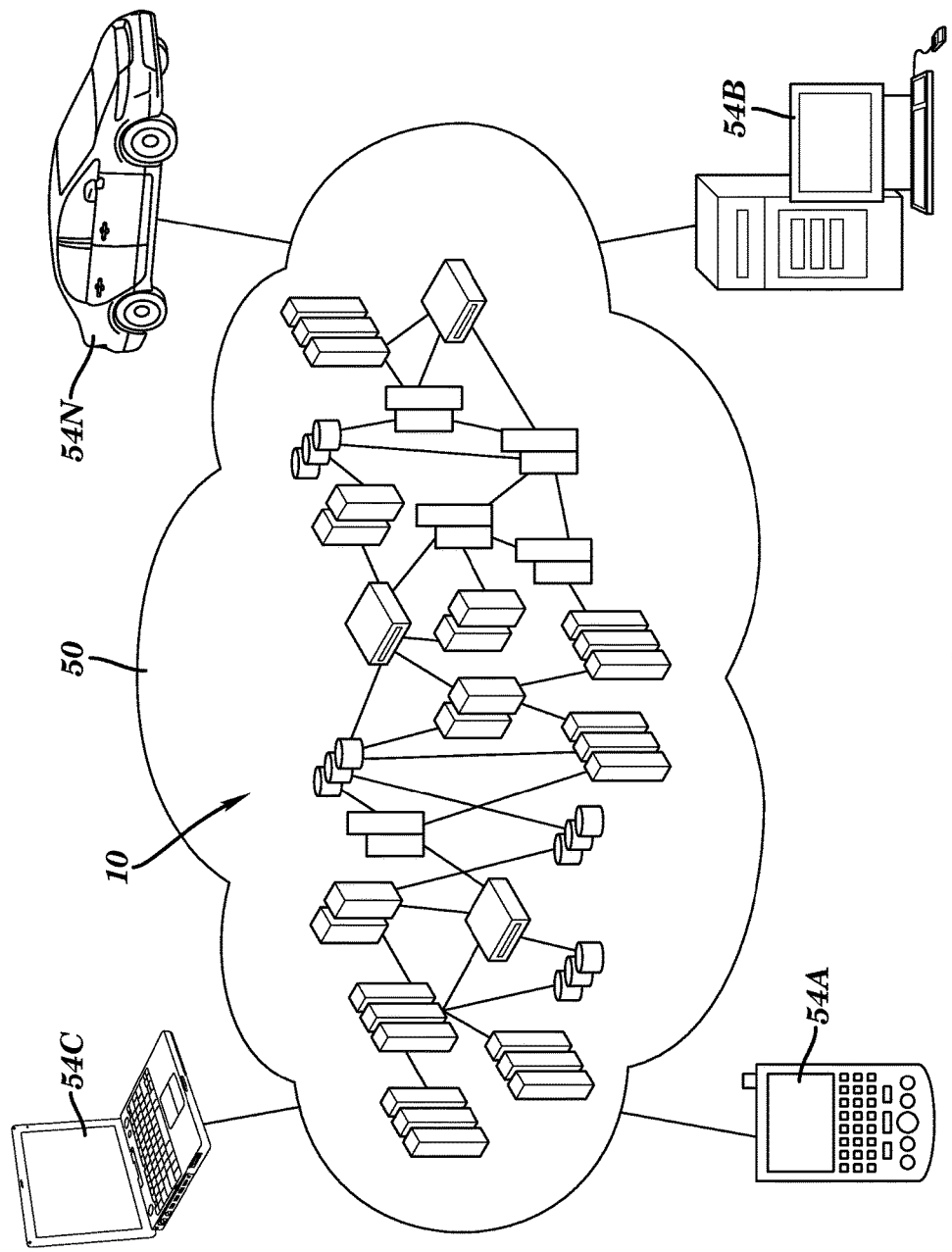
FIG. 2 illustrates a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
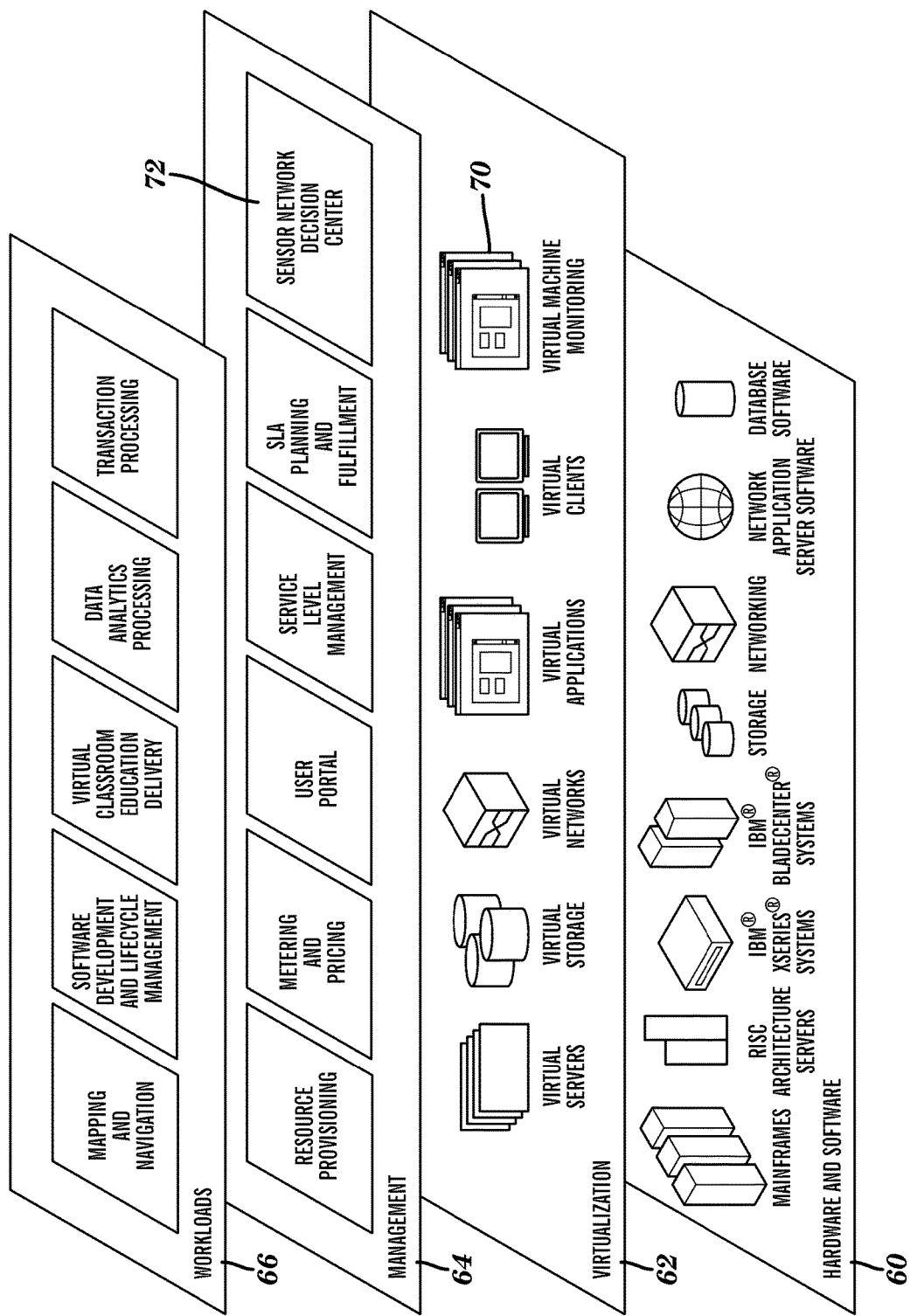
FIG. 3 illustrates abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; virtual clients; and virtual machine monitoring 70.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment, provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data integration workflow processing.

Cloud computing is an attractive way to deliver services using a number of delivery models, e.g., as Software as a Service (SaaS), Platform as a Service (Paas), Infrastructure as a Service (IaaS) as mentioned above. Cloud computing is attractive since it simplifies management from the end user perspective and delivers efficiencies that come from pooling resources. One potential drawback of cloud computing is increased communication between the end-user terminal and the cloud computing infrastructure.

Increasingly, smartphones (i.e., mobile devices) are the terminals of choice through which the end users consume different cloud computing applications and services. The present invention can be used to deliver cloud services and applications to the smartphones (and other wireless devices connected through cellular infrastructure) in a more efficient manner by optimizing communication between the smartphones and cloud computing infrastructure. In a cellular network, the cloud computing infrastructure may be located in the base stations (BSs) to minimize latency between the end-user terminals and the cloud. Alternatively, the cloud computing infrastructure may be hosted in the physical space that houses aggregation points, radio network controller, or core network. In either case, the bandwidth between the smartphones and the BS and the bandwidth between the BSs and the radio network controller can be limited and needs to be carefully used to optimize the user experience and deliver high quality cloud computing applications and services. The present invention discloses a method in which applications are tuned to address the bottlenecks in different communication links based on the measurements available at the BS in such a manner that the benefits of doing so are improved and the cost of measurements are reduced. It is noted that the utility of the described embodiments are not limited to applications and services being delivered using the cloud computing model.

In one exemplary embodiment, a sensor network decision center application 72 in the management layer 64 implements the processes described herein; however, it will be understood that the sensor network decision center application 72 may be implemented in any layer.

The sensor network decision center application 72 includes one or more algorithms or functions to implement embodiments described herein to assess QoI in sensor networks as well as to assess sensing capabilities of sensors within sensor networks. In an embodiment, the sensor network decision center application 72 along with other portions of management layer 64 and/or virtualization layer 62 are coupled to and/or reside in the memory 28 shown in FIG. 1. In addition, embodiments of the sensor network decision center application 72 include one or more program modules 42 of the program/utility 40 shown in FIG. 1. In a further embodiment, the sensor network decision center application 72 is part of the management layer 64 and is executed on hardware located in the hardware and software layer 60.

Figure 4:
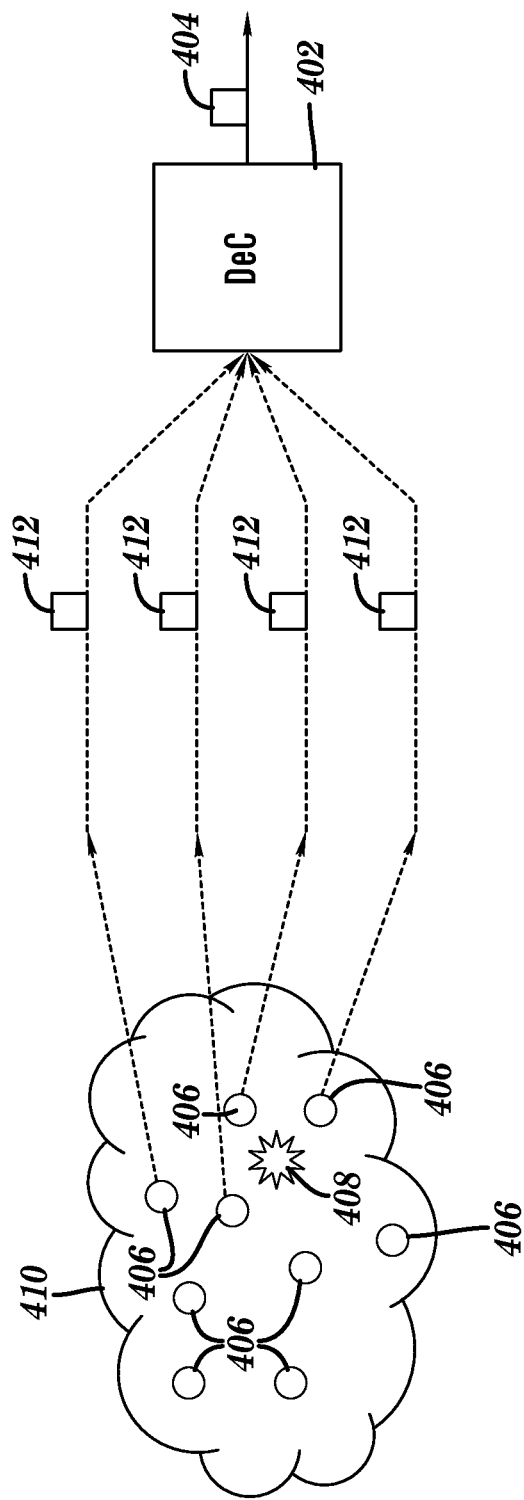
FIG. 4 illustrates a diagram of a sensor network and a sensor network decision center in accordance with an embodiment of the present invention.

Turning now to FIG. 4, a diagram of a sensor network 410 and a sensor network decision center 402 in accordance with an embodiment of the present invention is generally shown. As shown in FIG. 4, a large number of generic sensors 406 (e.g., acoustic, seismic, temperature) are deployed over areas of interest and the sensors 406 collaboratively contribute to situation assessment. Sensors 406 (or "regional" sensor networks 410 made up of two or more sensors 406)

make decisions about events 408 that they observe and the sensors 406 transmit their decisions via reports 412, to a central (or regionally central) sensor network decision center 402. An example decision could be that the air-pollution due to car emissions at a specific intersection observed by the sensors has reached a critical level. Individual sensors may not always make a determination of a situation and issue a pertinent decision. Rather, they may only report the measurements they make (e.g., the air-pollution levels observed) and provide these to an appropriate entity that makes determinations and decisions, such as the sensor network decision center 402. Sensors (or regional sensor networks) provide their decisions, or their measurements, in sensor reports which they provide over the sensor network (and other appropriate networks such as the Internet) to the sensor network decision center 402. Note that in alternative embodiments, individual sensors may first report to regional sensor networks, which, in turn may, compose new reports to send to the sensor network decision center 402 based on the contents of the reports they received.

In an embodiment, a report 412 may include, but is not limited to, one or more of: a timestamp reflecting when the report was generated; a measured value (e.g., an air-pollution level) or decision made (e.g., "the pollution level is above specified threshold"); timestamps for each (or group of) the measurements or decisions made; and information about the sensing platform, such as, but not limited to, the brand and model of the sensor, its battery reserve (if it relies on battery for its operation), its location, and its configuration set-up (e.g., threshold level). Alternatively, and especially for static information, the report may include an indicator to a repository entry that contains pertinent information about the sensor such as, but not limited to: sensor model; location (for fixed position sensors); sensor and sensor network administrator and operator; operational credentials such as certification; and maintenance log).

The sensor network decision center 402 executes a sensor network decision center application 72 (e.g., on a computer processor such as processing unit 16 in computer system 12) in order to estimate the QoI received at the sensor network decision center 402. In an embodiment, an output 404 from the sensor network decision center 402 is the estimated QoI received at the sensor network decision center 402. In an embodiment, the output from the sensor network decision center 402 is an alert that is communicated to proper authorities for subsequent action. For example, in the case of the air-pollution level crossing a threshold level, this may indicate excessive traffic congestion and an alert may be sent to traffic control authorities that may act by altering the flows of traffic leading to the intersection. Hence, to reduce congestion and air-pollution, traffic may be diverted around the congested areas by altering the traffic signaling and traffic flow signage on the way to the congested area. In an embodiment, this could happen under an explicit intervention of a traffic authority which may need to first approve the traffic changes. In another embodiment, this could happen automatically with the computer processes in the sensor network decision center communicating directly with the computing processes that control the pertinent traffic lights and traffic flow signage.

As shown in FIG. 4, the sensor network decision center 402 is not tied to any specific sensor 406 or regional sensor network 410. Events 408 occur over a spatiotemporal horizon and only a subset of sensors 406 can record each event 408. If a sensor 406 does not report an event 408, it does not automatically mean that it missed a measurement or that there was a delay in the transmission or some other communications problem. It could mean, for example, that the sensor 406 did not report the event due to duty cycling (e.g., where a sensor 406 is powered on of a certain percentage of the time and powered off the rest of the time).

In an embodiment, the sensor network decision center application 72 reacts to the information received from the sensors 406. For example, the sensors 406 may monitor a municipal quality of life measurement such as air quality and/or traffic. Sensors 406 may be located in fixed locations (e.g., attached to telephone poles, buildings, etc.) and/or they may be mobile (e.g., attached to cars, cell phones, etc.).

In an embodiment, the output 404 from the sensor network decision center 402 is a report that includes a decision that the sensor network decision center 402 is making (e.g., that the pollution has crossed a threshold or that event x took place in location y). The output 404 may also include a QoI associated with the decision. Thus the QoI may be reflective on the confidence on the validity of the output produced based on the data received (the analysis of which caused the output to be produced). The level of confidence placed on the output 404 is based on the level of confidence place on the data received from the sensors. Thus, the confidence level (and hence the QoI) may be applied to either (or both) the incoming data or the decision made.

Figure 5:
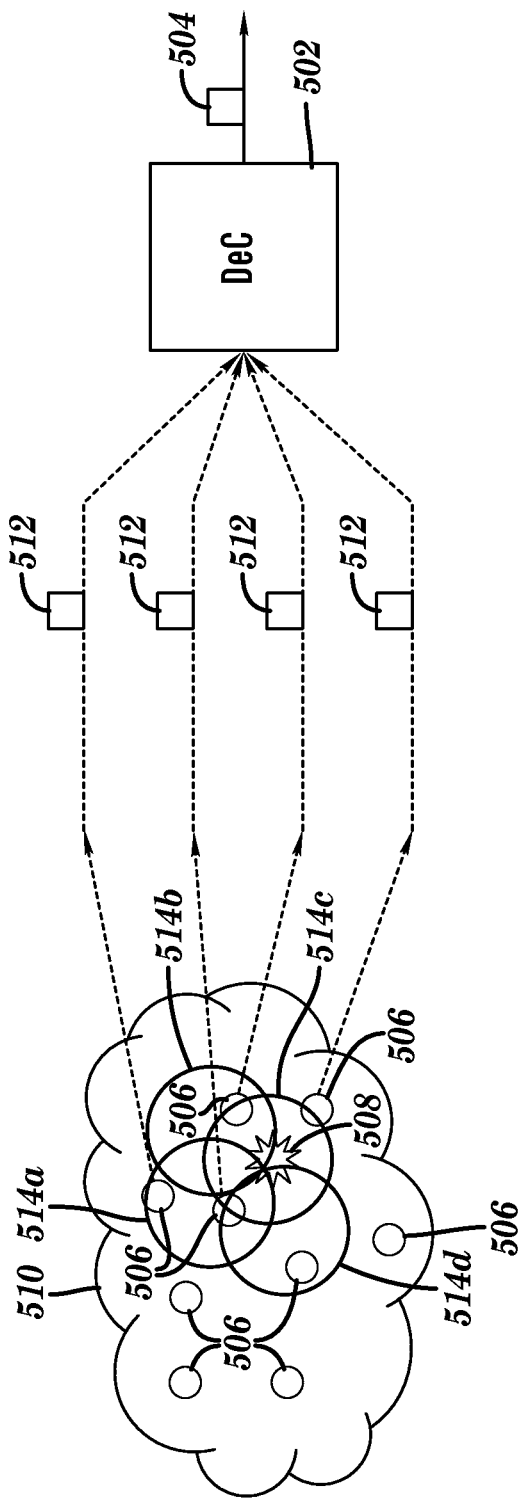
FIG. 5 illustrates a diagram of a sensor network and a sensor network decision center when it is assumed that each region is covered by at least a specified number of sensors in accordance with an embodiment of the present invention.

Turning to FIG. 5, a diagram of a sensor network 510 and a sensor network decision center 502 in accordance with an embodiment of the present invention is generally shown. In the case shown in FIG. 5, the maximum number of sensors 506 that can report an event 508 is unknown and it is assumed that each region 514a 514b 514c 514d is covered by a least a specified number of sensors 506. An assumption is made that the deployment of sensors 506 is such that each region 514a 514b 514c 514d is covered by at least "k" sensors, and thus, ideally each event 508 is reported by at least k sensors. Suppose that k is equal to two and thus, each of the regions 514a 514b 514c 514d shown in FIG. 5 is assumed to be covered by at least two sensors 506. In the example shown in FIG. 5, the region 514c which covers the area that is within a specified distance of event 508 is assumed to be covered by at least two sensors 506.

In an embodiment, if the sensor network decision center 502 receives reports 512 from two sensors 506 that are within region 514c, then the report output 504 from the sensor network decision center 502 includes a first decision and a first QoI level. If the sensor network decision center 502 receives reports 512 from only one sensor 506 that is within region 514c, then the report output 504 from the sensor network decision center 502 includes a second decision and a second QoI level that indicates a lower confidence in the data received from the sensors 506 and corresponding decision made than the first decision and the first QoI level. If the sensor network decision center 502 receives reports 512 from three sensors 506 that are within region 514c, then the report output 504 from the sensor network decision center 502 includes a third decision and a third QoI level that indicates a higher confidence in the data received from the sensors 506 and corresponding decision made than the first decision and the first QoI level.

In an embodiment, if the reports 512 from two of the sensors 506 contain similar information about the event 508, then the report output 504 from the sensor network decision center 502 includes a fourth decision and a fourth QoI level. If the reports 512 from three of the sensors 506 contain similar information about the event 508, then the report output 504 from the sensor network decision center 502 includes a fifth decision and a fifth QoI level that indicates a higher confidence in the data received from the sensors 506 and corresponding decision made than the fourth decision and the fourth QoI level. In an embodiment, these two approaches are combined to produce an output 504 that reflects a level of confidence in the data received and decisions made based on the received data that is based on both the number of sensors 506 reporting and the consistency of data received from the reporting sensors 506.

In the example above, k is set to two for ease in description. The value of k may be any number, from one to several thousand or more, and is set based on information about the deployment topology of sensors within a geographic area. In addition, the value of k may programmatically be changed based on factors such as, but not limited to: time of day, type of day (e.g., on holidays k may be higher), and historical data about the number of sensors detected in the past in the region.

Figure 6:
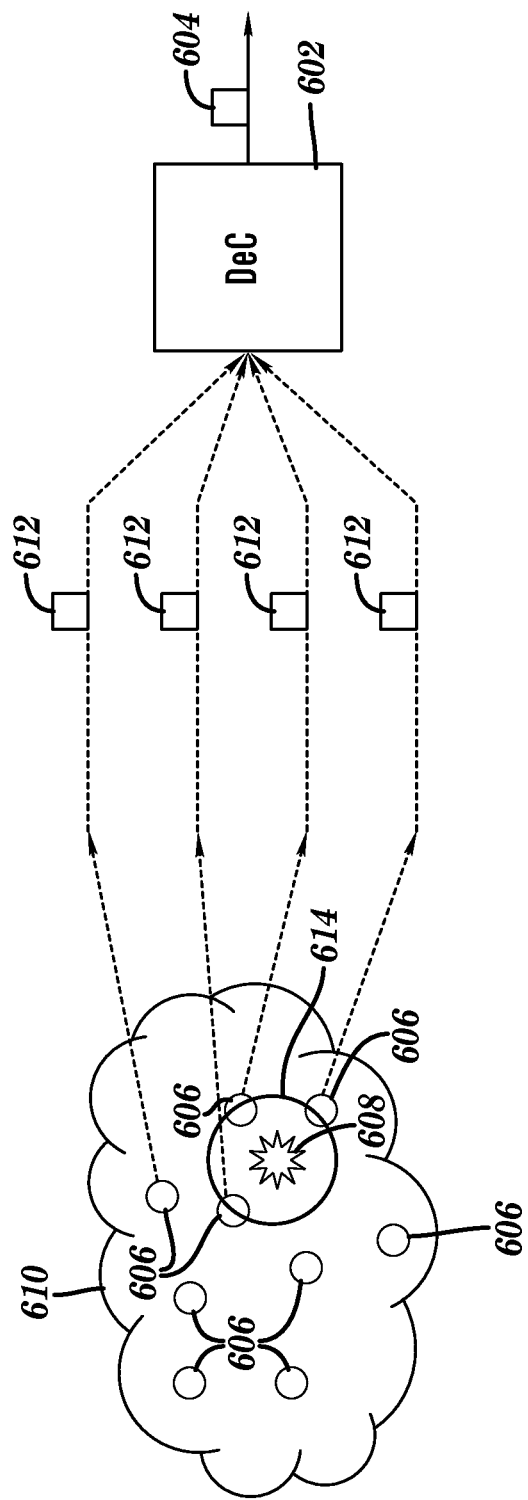
FIG. 6 illustrates a diagram of a sensor network and a sensor network decision center when it is assumed that sensors are deployed with a specified density in accordance with an embodiment of the present invention.

Turning to FIG. 6, a diagram of a sensor network 610 and a sensor network decision center 602 in accordance with an embodiment of the present invention is generally shown. In the case shown in FIG. 6, it is assumed that sensors 606 are deployed with a specified density, "p". If the sensors 606 are deployed with density, p, then a region 614 having an area of "A" will contain A multiplied by p (Ap) sensors 606 (on average). Thus, on average Ap sensors 606 will provide samples in reports 612 to the sensor network decision center 602. This approach requires using an estimate of the average area, A, that an event 608 can impact.

Suppose that density, p, is equal to one sensor per square meter and the area, A, is equal to three square meters. Then, the region 614 shown in FIG. 6 is expected to be covered by at least three sensors 606. As shown in FIG. 6, the sensor network decision center 602 receives reports 612 from three sensors 606 that are within region 615. In an embodiment, if the reports 612 from two of the sensors 606 contain similar information about the event 608, then the report output 604 from the sensor network decision center 602 includes a first decision and a first QoI level. If the reports 612 from three of the sensors 606 contain similar information about the event 608, then the report output 604 from the sensor network decision center 602 includes a second decision and a second QoI level that indicates a higher confidence in the data received from the sensors 606 and corresponding decision made than the first decision and the first QoI level.

In an embodiment, if the sensor network decision center 602 receives reports 612 from three sensors 606 that are within region 614, then the report output 604 from the sensor network decision center 602 includes a third decision and a third QoI level. If the sensor network decision center 602 receives reports 612 from only two sensors 606 that are within region 614c then the report output 604 from the sensor network decision center 602 includes a fourth decision and a fourth QoI level that indicates a lower confidence in the data received from the sensors 606 and corresponding decision made than the third decision and the third QoI level. If the sensor network decision center 602 receives reports 612 from four sensors 606 that are within region 614, then the report output 604 from the sensor network decision center 602 includes a fifth decision and a fifth QoI level that indicates a higher confidence in the data received from the sensors 606 and corresponding decision made than the first decision and the first QoI level.

In an embodiment, these two approaches are combined to produce a report output 604 from the sensor network decision center 602 that reflects a level of confidence in the data received and decisions made based on data received that is based on both the number of sensors 606 reporting and consistency of data received from the reporting sensors 606.

In the example above, p is set to one sensor per square meter and A is set to three square meters for ease in description. The value of p may be any number, from one to several thousand or more, and may be expressed in any units (e.g., square miles, square feet, square kilometers) and is set based on information about the deployment topology of sensors within a geographic area. Similarly, the value of A may be any number, from one to several thousand or more, and may be expressed in any units (e.g., square miles, square feet, square kilometers) and is set based on information about the deployment topology of sensors within a geographic area. In addition, the values of p and A may programmatically be changed based on factors such as, but not limited to: time of day, type of day (e.g., on holidays k may be higher), and historical data about the number of sensors detected in the past in the region.

The approaches shown in FIGS. 5 and 6 can be further generalized to consider deployment density distributions such as, but not limited to: two dimensional (2D) Poisson on the entire area of deployment, and 2D Gaussian around the "center" of the deployment region. Embodiments based on this approach introduce the percentiles of area impact in terms of how large/small an area should be such that no more than "y" percent of sensors in the area record the event.

The approaches described previously in reference to FIGS. 5 and 6 may be referred to as parametric in that they assume that the underlying deployment topology satisfies parametric constraints (e.g., k-coverage, density distribution, etc.). In embodiments, non-parametric principles may also be considered. An embodiment of a non-parametric approach includes using existing measurements and knowledge of sensor locations to estimate the number of sensors that did not report the event, and making a statement about the quality of the report. For example, a sensor network decision center, such as sensor network decision center 602, may receive reports about an event, such as event 608, from several different sensors, such as sensors 606. The two sensors that reported the event that are the farthest away from each other are identified and their distance apart, "d*", is calculated. An area, "A(d*)" defined by d* is identified. In an embodiment A(d*) is a circle that includes the two farthest apart reporting sensors. In another embodiment, A(d*) is a square or other shape. All sensors within A(d*) are expected to provide reports on the event. In an embodiment, the number of sensors within A(d*) is calculated using one or more of k-coverage, and density distribution as described previously.

For example, suppose that an event must be identified and announced within "T" seconds from its occurrence. Using the diagram of the sensor network 610 and the sensor network decision center 602 shown in FIG. 6 as an example, several actions take place within the T seconds including: a local decision is made at the sensor level (e.g., by a sensor 606) to report the event 608; a report 612 is sent over the communication link to the sensor network decision center 602; and a decision is made at the sensor network decision center 602 to generate an output 604 that includes a report that announces the occurrence of the event 608. For this example, it is assumed that all of the processing and communication delays are small compared to the time interval of T seconds and can be ignored. Now, suppose that the event 608 affects region 614 with area A, and that the sensors 606 are deployed in the region 614 with a density of r; and, hence, the number of sensors 606 expected to report on the event 608 is Ar. Thus, in this example, the time based quality criterion is $Q_T = j_T / Ar$ where $j_T$ is the number of sensors 606 that, within T seconds, have locally decided in favor of the event 608 as viewed by the sensor network decision center 602. In this example, it is assumed that sensors 606 only send reports 612 when there positive decisions made (e.g., they detect the event 608).

In an embodiment, A is determined by selecting the maximum distance $d_{max}$ between all pairs of sensors 606 that reported event 608 no more than T seconds apart (a non-parametric approach). The area A is the circular area with diameter $d_{max}$ located in the midst of two sensors whose distance between them is $d_{max}$. Thus, A, the area of the region 614, is $\pi(d_{max}/2)^2$. In this example, the QoI ratio at time "T" is $Q_T = j_T/Ar$ which is equal to $\{[4 j_T]/[\pi(d_{max})^2 r]\}$.

There are different strategies to computing $j_T$, which is expected to depend on T, the amount of time to report the event 608, hence the notation $j_T$. In an embodiment, time is segmented into intervals of length T, and sensor made decisions that arrive within each such interval, or jumping window, are counted. In an embodiment, counting is started from the time when the first decision arrives. In another embodiment, timestamps of decisions included in reports are also taken into consideration. For example, a decision arriving later may have an earlier timestamp, indicating that the event occurred earlier than originally thought.

Figure 7:
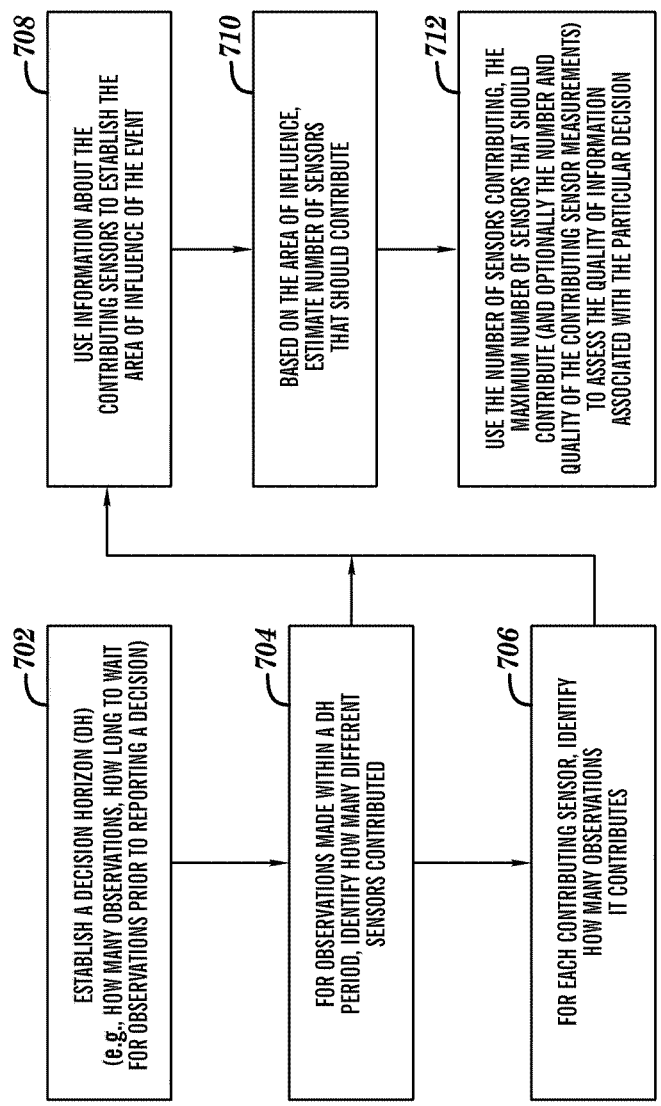
FIG. 7 illustrates a processor for assessing the quality of information (QoI) in a sensor network in accordance with an embodiment of the present invention.

FIG. 7 illustrates a process for assessing the quality of information (QoI) in a sensor network in accordance with an embodiment of the present invention. In an embodiment, the process shown in FIG. 7 is executed by a computer, such as computer system 12 shown in FIG. 1. At block 702, a decision horizon is established to specify factors such as, but not limited to: how many observations to collect, and how long to wait for observations prior to reporting an estimated QoI from a network center decision center. For observations made (e.g., reports received from sensors) within the decision horizon period it is determined, at block 704, how many different sensors contributed. At block 706, it is determined how many observations were contributed by each contributing sensor. At block 708, information about the contributing sensors is used to establish the area of influence (e.g., the region) of the event. Based on the area of influence, for each contributing sensor, the number of sensors that should contribute is estimated at block 710. At block 712, a QoI associated with the particular decision is assessed based on the number of sensors contributing, and the maximum number of sensors that should contribute (and optionally the number and quality of contributing sensor measurements).

In an embodiment, an analysis of sensor reports received is used to discover if there are other quality issues pertaining to the sensory platforms themselves. For a collection of sensory reports taken from the same spatiotemporal region, it is expected that they will contain collaborative reports. Deviations in the reports may be indicative of diverting operational characteristics of the corresponding sensory platforms. In this case, the reports are further analyzed to identify characteristics of the sensory platforms and correlate these features with observed reporting behavior. In an embodiment, the sensory platforms are smartphones that are being used for participatory sensing. Smartphone metadata or characteristics (e.g., brand, model, year of manufacture, software version, hardware version, battery reserves, operating system, software configuration parameter, hardware configuration parameter, a platform the sensor is mounted on, a platform owner, a platform administrator, a sensor owner, and a sensor administrator) are included in the reports to a sensor network decision center or alternatively, obtained from the network services provider serving these smartphones. In an embodiment, the latter can be done if the analysis of the sensor reports is performed by the network services provider who can retrieve subscriber and device information from its own service and subscriber repositories. The network service provider may use the results of this analysis for its own purposes, e.g., to troubleshoot the smartphones and the services they offer on its network. The network provider may also provide the analysis results to third party entities, e.g., smartphone manufacturers for their troubleshooting purposes. In an embodiment, the analysis of the sensor reports may be performed by a party other than the network services provider, e.g., smartphone manufacturers. In this case, the network service provider may supply the sensor reports along with pertinent service and subscriber information to the third party. By correlating the sensor reports with the metadata, it can be determined whether the sensing modules of the report operate as expected or whether they have potential software and/or hardware errors or inconsistencies. This information is output from sensor network decision center and may be used to upgrade the sensory platforms. In addition, this information may be used as a factor in generating a QoI estimate.

For example, suppose that M1 sensor reports are received that indicate that traffic may currently not be moving in a particular street intersection of interest (e.g., a spatiotemporal region of interest). Also suppose that M2 sensor reports are received from an area around the particular street intersection of interest that indicate that traffic may be flowing through the intersection of interest. And there may be a third group of M3 sensor reports that are inconclusive about the status of the traffic at the particular street intersection of interest. An embodiment would further analyze the reports to determine the commonalities and differences between the sensors and/or sensor platforms generating the M1, M2, and M3 sensor reports. For example, most of the M2 reports may come from a particular type of sensor and/or from a sensor platform executing the same type of software (i.e., sensors having the same or similar metadata). This may indicate an error in the hardware and/or software of the sensors generating the M2 reports. Or vice versa, it may indicate an error in the hardware and/or software of the sensors generating the M1 reports. In addition, the reports of inconclusiveness from the sensors generating M3 reports may indicate that these sensors require an upgrade or a repositioning (for fixed sensors) or other maintenance action. This type of analysis allows for the use of incoming reports from sensors for troubleshooting sensing platforms in very loosely coupled systems without the need to closely monitor the platforms themselves, but instead by comparing their information producing behavior against other platforms that happen to operate in their vicinity. As mentioned earlier, the results of this assessment of operating characteristics of the sensors can be received by the network service provider to troubleshoot the smartphones and services used by its subscribers, or by the smartphone or smartphone application manufacturers to troubleshoot the smartphone platforms and applications respectively.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system comprising:
a processor configured for:
evaluating a first value reflective of a number of available reports from sensors about an event in a monitored location, the sensors located in the monitored location and dynamically associated with a network;
estimating a second value reflective of a number of reports expected to have been available for evaluation about the event in the monitored location, the estimating based on an expected density of sensors in a region around the monitored location;
assessing a quality of information (QoI) of the available reports, the assessing based on the first value reflective of the number of available reports and the second value reflective of the number of reports expected to have been available for evaluation;
determining a status of the monitored location area based on the available reports and the assessing; and
outputting the status of the monitored location, the status including a request to take an action at the monitored location based on the status indicating that a threshold level has been crossed, the outputting the status to a second processor that controls a flow of traffic leading to the monitored location in response to the request to take an action by altering at least one of traffic flow signage and a traffic signal.

2. The system of claim 1, wherein the processor is further configured for receiving the available reports from the sensors during a time period, wherein the estimating is further based on the time period.

3. The system of claim 1, wherein the estimating is further based on an expected number of sensors in the region around the monitored location.

4. The system of claim 1, wherein the assessing is further based on contents of the available reports.

5. The system of claim 1, wherein the sensors include fixed and mobile sensors.

6. The system of claim 1, wherein the status includes the QoI.

* * * * *